US012722905B2

(12) United States Patent
Ueda et al.

(10) Patent No.: US 12,722,905 B2
(45) Date of Patent: Sep. 1, 2026

(54) ARTICLE TRANSPORT FACILITY

(71) Applicant: Daifuku Co., Ltd., Osaka (JP)

(72) Inventors: Toshihito Ueda, Hinocho (JP); Tatsuki Ii, Hinocho (JP); Akira Suzuki, Hinocho (JP); Tomoaki Nishikawa, Hinocho (JP); Shota Inden, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 468 days.

(21) Appl. No.: 18/223,085

(22) Filed: Jul. 18, 2023

(65) Prior Publication Data

US 2024/0025659 A1 Jan. 25, 2024

(30) Foreign Application Priority Data

Jul. 19, 2022 (JP) ................................ 2022-114788

(51) Int. Cl.
*B65G 43/10* (2006.01)
*B65G 35/06* (2006.01)
(Continued)

(52) U.S. Cl.
CPC ............. *B65G 43/10* (2013.01); *B65G 35/06* (2013.01); *B65G 43/00* (2013.01); *G05D 1/225* (2024.01); *G05D 1/226* (2024.01); *G05D 1/227* (2024.01); *G05D 1/646* (2024.01); *G05D 1/693* (2024.01); *G05D 1/6987* (2024.01);
(Continued)

(58) Field of Classification Search
CPC B65G 43/10; B65G 35/06; B65G 2203/0283; B65G 35/00; B65G 43/00; G05D 1/225; G05D 1/226; G05D 1/227; G05D 1/646; G05D 1/693; G05D 1/6987; G05D 2105/28; G05D 2107/70;
(Continued)

(56) References Cited

U.S. PATENT DOCUMENTS

2013/0197673 A1 8/2013 Kobayashi
2017/0082989 A1* 3/2017 Kumagai ............... B65G 43/00
(Continued)

FOREIGN PATENT DOCUMENTS

CN 108001979 A * 5/2018 .......... H10P 72/3408
CN 109850515 A * 6/2019 ............. B23P 19/04
(Continued)

*Primary Examiner* — Ernesto A Suarez
*Assistant Examiner* — Laurence R Brothers
(74) *Attorney, Agent, or Firm* — The Webb Law Firm

(57) ABSTRACT

A normal control mode and a substitute control mode are set, as control modes that are executed by a control system including a higher-level control device and a section control device. The normal control mode is a mode in which control of a transport vehicle in a specific section is performed by the section control device responsible for the specific section, and the substitute control mode is a mode in which control of the transport vehicle in a specific section is performed by the higher-level control device instead of the section control device responsible for the specific section. The substitute control mode is executed in response to at least one of an anomaly occurring in communication between the section control device and the higher-level control device and an anomaly occurring in communication between the section control device and the transport vehicle.

6 Claims, 7 Drawing Sheets

(51) Int. Cl.

| | |
|---|---|
| ***B65G 43/00*** | (2006.01) |
| ***G05D 1/225*** | (2024.01) |
| ***G05D 1/226*** | (2024.01) |
| ***G05D 1/227*** | (2024.01) |
| ***G05D 1/646*** | (2024.01) |
| ***G05D 1/693*** | (2024.01) |
| ***G05D 1/698*** | (2024.01) |
| ***G05D 105/28*** | (2024.01) |
| ***G05D 107/70*** | (2024.01) |
| ***G05D 109/10*** | (2024.01) |
| *B65G 35/00* | (2006.01) |
| *H10P 72/30* | (2026.01) |

(52) U.S. Cl.

CPC . *B65G 2203/0283* (2013.01); *G05D 2105/28* (2024.01); *G05D 2107/70* (2024.01); *G05D 2109/10* (2024.01)

(58) Field of Classification Search

CPC .......... G05D 2109/10; H01L 21/67727; H01L 21/67715; G06Q 10/08

See application file for complete search history.

(56) References Cited

U.S. PATENT DOCUMENTS

| | | | | |
|---|---|---|---|---|
| 2018/0122671 | A1* | 5/2018 | Niiyama | B65G 43/10 |
| 2019/0108010 | A1* | 4/2019 | Tillman | H04L 67/12 |
| 2023/0406644 | A1* | 12/2023 | Ueda | G06F 8/65 |

FOREIGN PATENT DOCUMENTS

| | | | | |
|---|---|---|---|---|
| JP | 2002316705 | A | * | 10/2002 |
| JP | 2006221309 | A | * | 8/2006 |
| JP | 2006313462 | A | * | 11/2006 |
| WO | 2012049917 | A1 | | 4/2012 |

* cited by examiner

100
R
Z
V
V
V
Z
V
Z
Z

Fig.2
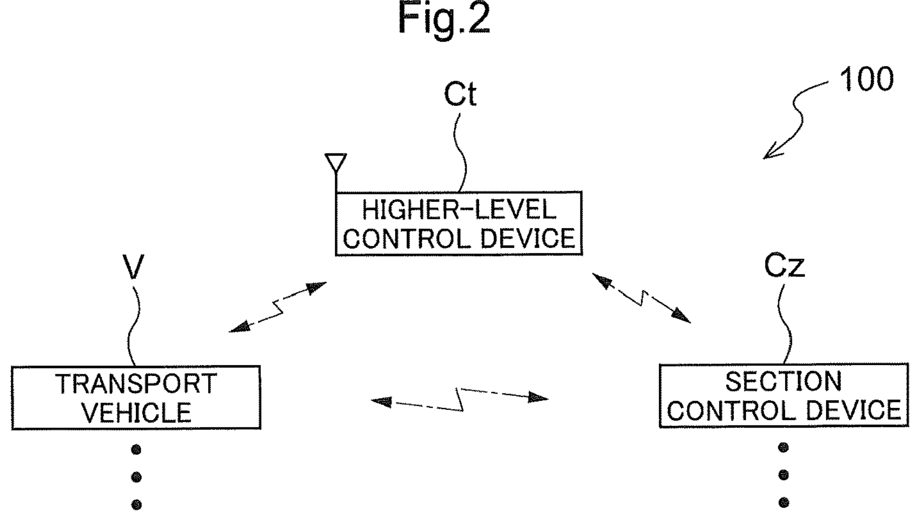
Fig.3
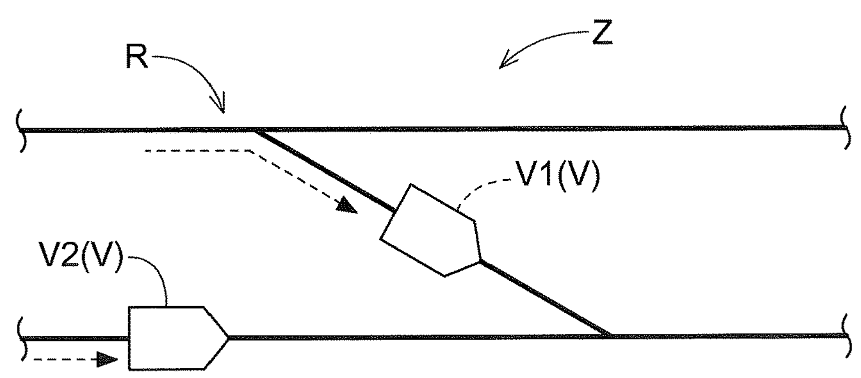
Fig.4
| CONTROL AGENT / CONTROL MODE | SECTION CONTROL DEVICE | HIGHER-LEVEL CONTROL DEVICE |
|---|---|---|
| NORMAL CONTROL MODE | ○ | △ |
| SUBSTITUTE CONTROL MODE | × | ○ |
| INDEPENDENT CONTROL MODE | ○ | × |
| SUSPEND MODE | × | × |
○ : CONTROL PERFORMED
△ : ASSIST CONTROL PERFORMED
× : CONTROL NOT PERFORMED NORMAL CONTROL MODE (EX. 2)
(a)
Ct
Cz
Z
Sr
Sp
V
R
(b)
Ct
Cz
Z
?
V
R
(c)
Ct
Iv
Iv
Z
Cz
V
R

ARTICLE TRANSPORT FACILITY

CROSS-REFERENCE TO RELATED APPLICATION

This application claims priority to Japanese Patent Application No. 2022-114788 filed Jun. 19, 2022, the disclosure of which is hereby incorporated by reference in its entirety.

BACKGROUND OF THE INVENTION

1. Field of the Invention

The present invention relates to an article transport facility provided with a transport vehicle for transporting articles, a travel route provided with a specific section including at least one of a branch point and a merge point, and a section control device for controlling the transport vehicle traveling through the specific section.

2. Description of the Related Art

JP 2006-221309A (Patent Document 1) discloses an example of such an article transport facility as a transport truck system. The reference numerals shown in parentheses in the following description of the related art are those of Patent Document 1.

In the system disclosed in Patent Document 1, a travel route (4) of transport vehicles (6) is divided into a plurality of zones, and a zone controller (20-22) is provided for each zone to control the transport vehicles (6) in the zone. The zone controllers (20-22) control the individual transport vehicles (6) such that the transport vehicles (6) do not interfere with each other at merge parts (8), branch parts (9) and the like.

As described above, in the system disclosed in Patent Document 1, each zone controller (20-22) controls the transport vehicles (6) in the zone for which the zone controller is responsible. However, when a problem such as a communication fault or failure occurs in one of the zone controllers, the transport vehicles (6) will no longer be appropriately controlled in the zone for which that zone controller is responsible, possibly resulting in situations such as interference between a plurality of transport vehicles (6).

SUMMARY OF THE INVENTION

In view of the above circumstances, it is desired to realize a technology capable of appropriately controlling transport vehicles traveling through a specific section including at least one of a branch point and a merge point, even in the case where an anomaly such as a communication fault or failure occurs in a control system.

The technology for solving the above problem is as follows.

An article transport facility including:

at least one transport vehicle configured to transport an article;

a travel route along which the at least one transport vehicle travels and provided with a plurality of specific sections each including at least one of a branch point and a merge point;

a section control device provided in correspondence with each of the specific sections and configured to control the at least one transport vehicle traveling through the specific section for which the section control device is responsible; and a higher-level control device configured to control the at least one transport vehicle and the section control devices, wherein the at least one transport vehicle, the section control devices and the higher-level control device are configured to communicate with each other, the article transport facility has a normal control mode and a substitute control mode, as control modes that are executed by a control system including the higher-level control device and the section control devices, the normal control mode is a mode in which control of the at least one transport vehicle in each of the specific sections is performed by the section control device responsible for the specific section, the substitute control mode is a mode in which control of the at least one transport vehicle in each of the specific sections is performed by the higher-level control device instead of the section control device responsible for the specific section, the normal control mode is executed while communication between the higher-level control device and the section control devices and communication between the section control devices and the at least one transport vehicle are normal, and the substitute control mode is executed in response to at least one of an anomaly occurring in communication between the section control devices and the higher-level control device and an anomaly occurring in communication between the section control devices and the at least one transport vehicle.

According to this configuration, while communication between the higher-level control device and the section control devices and communication between the section control devices and the transport vehicle are normal, the section control devices are able to appropriately perform control of the transport vehicle in the specific sections, due to the normal control mode being executed. In this way, in the normal state in which communication is normal, the section control devices perform control of the transport vehicle in the specific sections, thus also enabling the processing load of the higher-level control device to be reduced. On the other hand, in response to at least one of an anomaly occurring in communication between the section control devices and the higher-level control device and an anomaly occurring in communication between the section control devices and the transport vehicle, the higher-level control device performs control of the transport vehicle in the specific section, instead of the section control device responsible for that specific section, due to transitioning to the substitute control mode. Accordingly, even in the case where a section control device cannot control the transport vehicle in the specific section for which that section control device is responsible due to a communication anomaly, the higher-level control device is able to appropriately control the transport vehicle. As described above, according to this configuration, even in the case where an anomaly such as a communication fault or failure occurs in the control system, it is possible to appropriately control the transport vehicle traveling through the specific sections including at least one of a branch point and a merge point.

Further features and advantages of the technology according to the present disclosure will become clear from the following description of exemplary and non-limiting embodiments given with reference to the drawings.

BRIEF DESCRIPTION OF THE DRAWINGS

FIG. 2 is a control block diagram.

FIG. 3 shows control of transport vehicles traveling through a specific section.

FIG. 4 shows various control modes.

DESCRIPTION OF THE INVENTION

Hereinafter, an embodiment of an article transport facility will be described with reference to the drawings.

Figure 1:
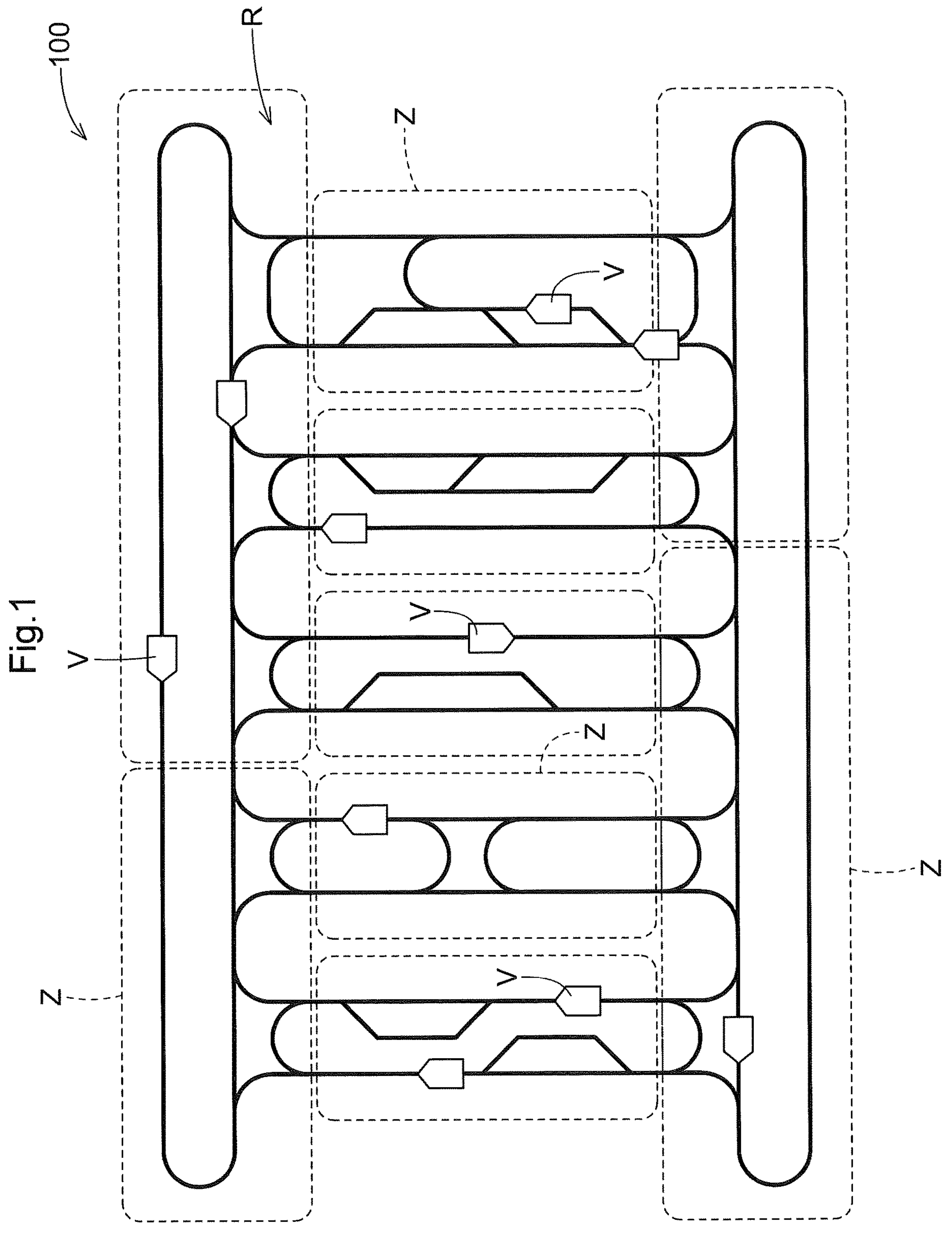
FIG. 1 is a plan view of an article transport facility.

As shown in FIGS. 1 and 2, this article transport facility 100 is provided with at least one transport vehicle V that transports articles, a travel route R along which the transport vehicle V travels and provided with a plurality of specific sections Z each including at least one of a branch point and a merge point, a section control device Cz that is provided in correspondence with each of the specific sections Z and controls the transport vehicle V traveling through the specific section Z, and a higher-level control device Ct that controls the transport vehicle V and the section control devices Cz. The transport vehicle V, the section control devices Cz and the higher-level control device Ct are able to communicate with each other.

In the present embodiment, the article transport facility 100 is provided with a plurality of transport vehicles V. The transport vehicles V are each configured to execute a task assigned thereto, based on a transport instruction given by the higher-level control device Ct. Examples of the transport vehicles V include unmanned transport vehicles that travel along the floor and overhead transport vehicles that travel near the ceiling.

The article transport facility 100 handles various articles. For example, in the case where the article transport facility 100 is used in a semiconductor manufacturing plant, such articles include wafer holding containers (so-called FOUP: Front Opening Unified Pods) for holding wafers and reticle holding containers (so-called reticle pods) for holding reticles. In this case, the transport vehicles V transport articles such as wafer holding containers and reticle holding containers along the travel route R between various processes.

The travel route R includes straight routes and curved routes, and also includes intersections where a plurality of routes intersect. The intersections include branch points where one route branches into a plurality of routes, and merge points where a plurality of routes merge. As described above, the specific sections Z each include at least one of such a branch point and a merge point. The specific sections Z each include one or more branch points, one or more merge points, or a combination thereof. In the example shown in FIG. 1, the specific sections Z are each set to a range including a plurality of branch points and a plurality of merge points on the travel route R. The specific sections Z can be set to any suitable range.

The higher-level control device Ct controls the transport vehicles V and section control devices Cz. For example, the higher-level control device Ct gives a transport instruction designating a transport origin and a transport destination of an article to each transport vehicle V. The higher-level control device Ct can communicate with each transport vehicle V, and can grasp the current position of each transport vehicle V. Also, the higher-level control device Ct can communicate with each section control device Cz, and can grasp the situation in each specific section Z, by receiving a situation report (traffic situation, etc.) relating to the specific sections Z from the respective section control devices Cz.

Each section control device Cz controls the transport vehicles V traveling through the specific section Z for which the section control device Cz is responsible. Specifically, the section control devices Cz allow a plurality of transport vehicles V to travel without interfering with each other in the respective specific sections Z for which the section control devices Cz are responsible. For example, FIG. 3 shows two transport vehicles V (one is given as first transport vehicle V1 and the other is given as second transport vehicle V2) traveling through a specific section Z including a branch point and a merge point. In the case where the first transport vehicle V1 and the second transport vehicle V2 are scheduled to pass through the same merge point, the section control device Cz controls the two transport vehicles to pass through at different times. In the example shown in FIG. 3, the section control device Cz controls travel of the two transport vehicles such that the first transport vehicle V1 passes through the merge point first, and the second transport vehicle V2 passes through the merge point after the first transport vehicle V1 by slowing down or stopping the second transport vehicle V2. In the present embodiment, the section control devices Cz control travel of the transport vehicles V from which is received a passage request signal Sr (see FIG. 5, etc.) for passing through the respective specific sections Z for which the section control devices Cz are responsible. This will be described in detail later.

The higher-level control device Ct and the section control devices Cz are, for example, provided with a processor such as a microcomputer, peripheral circuits such as memory, and the like. Respective processing or functions are then realized by such hardware cooperating with programs that are executed on the processor of a computer or the like. The article transport facility 100 is provided with a control system that includes at least the higher-level control device Ct and the section control devices Cz. This control system may also include other control devices, in addition to the higher-level control device Ct and the section control devices Cz.

As shown in FIG. 4, the article transport facility 100 has a plurality of control modes for controlling the transport vehicles V traveling through the specific sections Z. That is, a normal control mode and a substitute control mode are set as control modes that are executed by the control system including the higher-level control device Ct and the section control devices Cz. In the present embodiment, an independent control mode is set as a control mode, in addition to the normal control mode and the substitute control mode. Furthermore, a suspend mode is set as a control mode, in addition to the above modes.

In the normal control mode, the section control devices Cz are the agents in charge of control, and the higher-level control device Ct performs assist control. In the substitute control mode, the higher-level control device Ct is the agent in charge of control, and the section control devices Cz are not involved in control. In the independent control mode, the section control devices Cz are the agents in charge of control, and the higher-level control device Ct is not involved in control. In the suspend mode, the section control devices Cz and the higher-level control device Ct are both not involved in control. While a detailed description will be given later, in the suspend mode, a worker W controls the transport vehicles V (see FIG. 9), for example. Hereinafter, each control mode will be described in detail.

Figure 5:
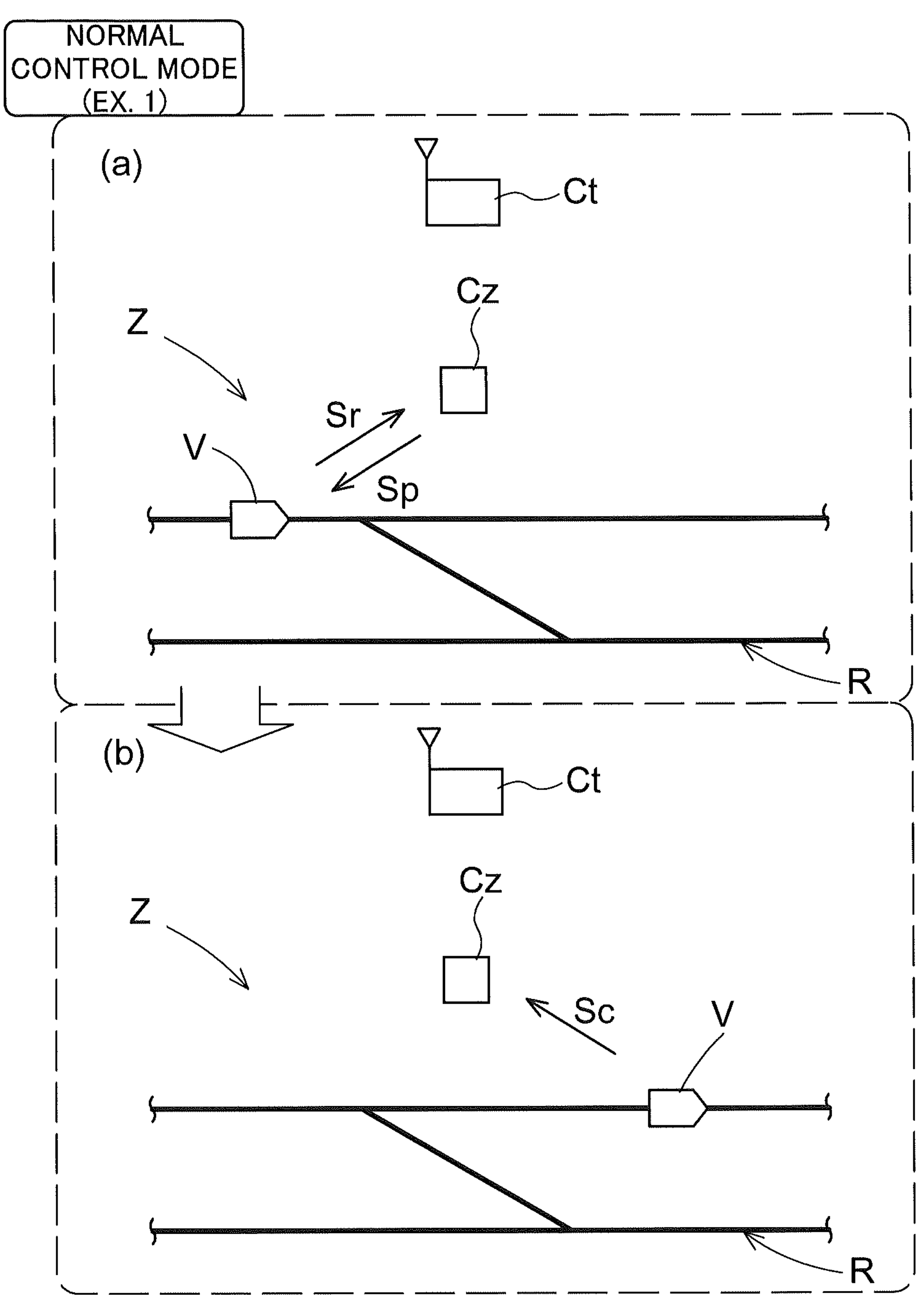
FIG. 5 shows a normal control mode (example 1).
Figure 6:
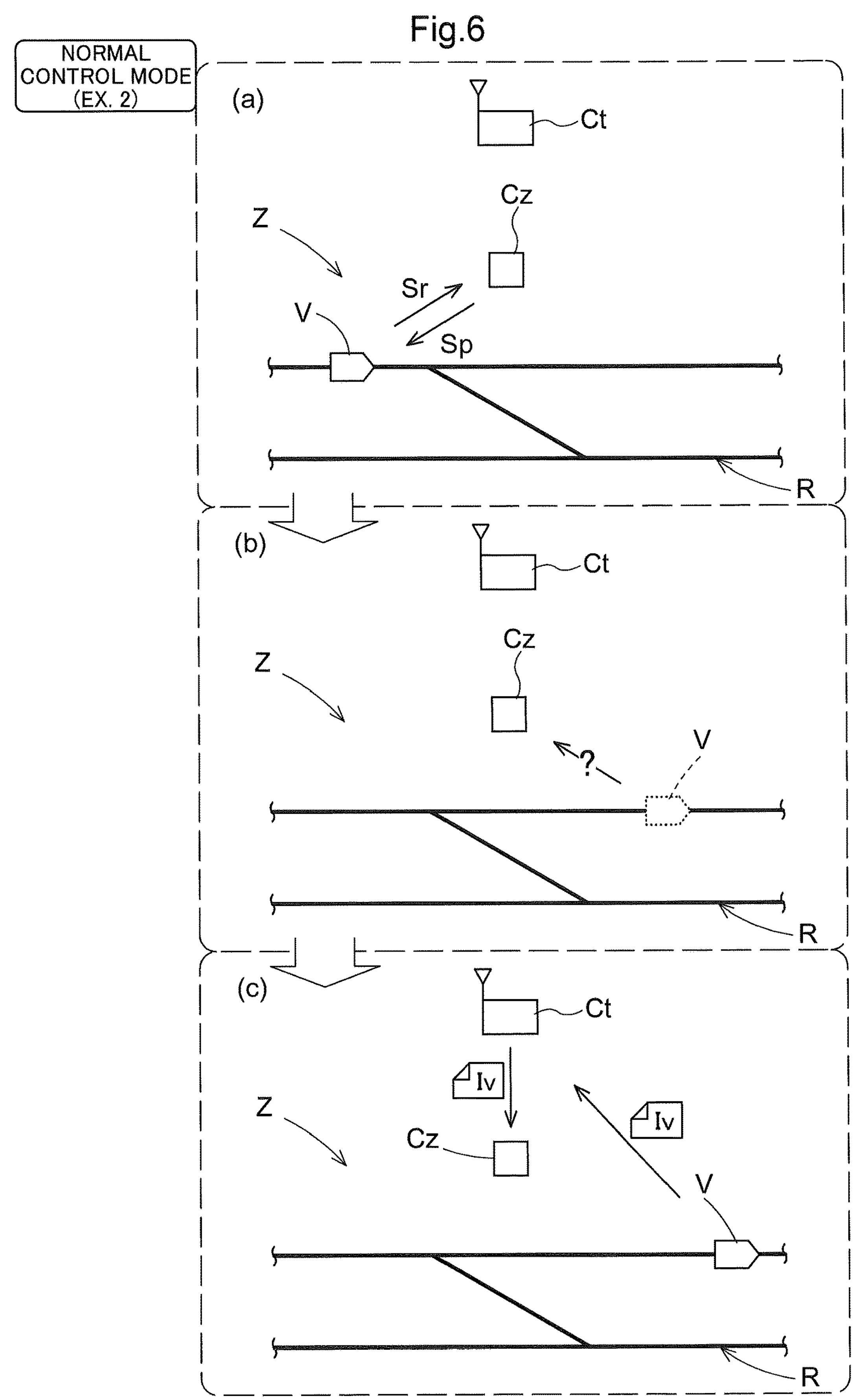
FIG. 6 shows a normal control mode (example 2).

FIGS. 5 and 6 show control of a transport vehicle V in a specific section Z in the normal control mode.

As shown in FIG. 5, the normal control mode is a mode in which control of the transport vehicles V in a specific section Z is performed by the section control device Cz responsible for that specific section Z. The normal control mode is executed while communication between the higher-level control device Ct and the section control devices Cz and communication between the section control devices Cz and the transport vehicles V are normal. That is, in the normal control mode in which the section control devices Cz are the agents in charge of control and the higher-level control device Ct assists the section control devices Cz (see FIG. 4), the section control devices Cz are required to be able to communicate with both the higher-level control device Ct and the transport vehicles V.

As shown in FIG. 5A, in the present embodiment, the transport vehicle V transmits the passage request signal Sr for requesting permission to pass to the agent in charge of controlling the specific section Z when upstream of the specific section Z (specifically when upstream of the branch point or merge point of the specific section Z; the same applied below). In the normal control mode, the transport vehicle V transmits the passage request signal Sr to the section control device Cz provided in correspondence with the specific section Z that the transport vehicle V is about to pass through.

Having received the passage request signal Sr, the section control device Cz, in the case of permitting passage of the transport vehicle V that transmitted the passage request signal Sr, then transmits a passage permission signal Sp for permitting passage to the transport vehicle V.

In the present embodiment, if there is another transport vehicle V (leading transport vehicle) that transmitted the passage request signal Sr before the above transport vehicle V (trailing transport vehicle) transmitted the passage request signal Sr, and that transport vehicle V (leading transport vehicle) has not finished passing through the specific section Z, the section control device Cz does not permit the transport vehicle V (trailing transport vehicle) that transmitted the passage request signal Sr later to pass through the specific section Z. If there is not another transport vehicle V (leading transport vehicle) leading the transport vehicle V (trailing transport vehicle) that transmitted the passage request signal Sr, or if there is another transport vehicle V (leading transport vehicle) that has already finished passing through the specific section Z, the section control device Cz permits the transport vehicle V (trailing transport vehicle) that transmitted the passage request signal Sr later to pass through the specific section Z.

The transport vehicle V, having received the passage permission signal Sp from the section control device Cz, travels through the specific section Z. Although not illustrated in detail, if the passage permission signal Sp is not received, that is, if permission to pass through the specific section Z is not given by the section control device Cz, the transport vehicle V stops upstream from the specific section Z and waits until permission to pass through the specific section Z is given by the section control device Cz.

As shown in FIG. 5B, after passing through the specific section Z, the transport vehicle V transmits a passage completion signal Sc for notifying completion of passage to the section control device Cz. The section control device Cz, having received the passage completion signal Sc, becomes able to accept the next transport vehicle V to the specific section Z.

In the present embodiment, in a specific section Z in which the normal control mode is being executed, the section control device Cz responsible for that specific section Z controls travel of the transport vehicles V, and the higher-level control device Ct executes assist control for assisting control by the section control device Cz. FIG. 6 shows an example in which the higher-level control device Ct assists the section control device Cz in the normal control mode as an example 2. Note that FIG. 5 referred to in the above description shows an example in which the section control device Cz is not assisted by the higher-level control device Ct in the normal control mode as an example 1. Hereinafter, example 2 will be described with reference to FIG. 6.

As shown in FIG. 6A, the transport vehicle V transmits the passage request signal Sr to the section control device Cz. Having received the passage request signal Sr, the section control device Cz, in the case of permitting passage of the transport vehicle V that transmitted the passage request signal Sr, transmits the passage permission signal Sp to the transport vehicle V.

Here, as shown in FIG. 6B, there are cases where the section control device Cz does not subsequently receive a response from a target transport vehicle V, which is the transport vehicle V that transmitted the passage request signal Sr. This can be caused by issues such as a communication fault or failure. For the section control device Cz, which mainly communicates with the transport vehicles V in relation to requests for passage and permission of passage through the specific section Z, no response from the transport vehicle V means that the presence of the transport vehicle V is unknown.

In the present embodiment, if the passage completion signal Sc (response) is not received from the target transport vehicle V before a prescribed period determined in advance elapses after receiving the passage request signal Sr from the target transport vehicle V, the section control device Cz makes an inquiry to the higher-level control device Ct. This "prescribed period" is determined as appropriate based on variables such as the distance to the specific section Z and the travel speed of the transport vehicle V.

As shown in FIG. 6C, the higher-level control device Ct, having received the inquiry, confirms the presence of the target transport vehicle V in the specific section Z based on current position information Iv of the target transport vehicle V acquired from the target transport vehicle V, and notifies the confirmation result to the section control device Cz. That is, in assist control, if the section control device Cz does not subsequently receives a response from the target transport vehicle V, which is the transport vehicle V that transmitted the passage request signal Sr, the higher-level control device Ct notifies the section control device Cz as to whether the target transport vehicle V is present in the specific section Z. According to the above configuration, even if the section control device Cz does not receive a response from the transport vehicle V, control of the transport vehicle V in the specific section Z can be more appropriately performed, through cooperation between the section control device Cz and the higher-level control device Ct.

If notification that the target transport vehicle V is in the specific section Z is received from the higher-level control device Ct, the section control device Cz does not accept the next transport vehicle V to the specific section Z. On the other hand, if notification that the target transport vehicle V has already left (is not present in) the specific section Z is received from the higher-level control device Ct, the section control device Cz becomes able to accept the next transport vehicle V.

Figure 7:
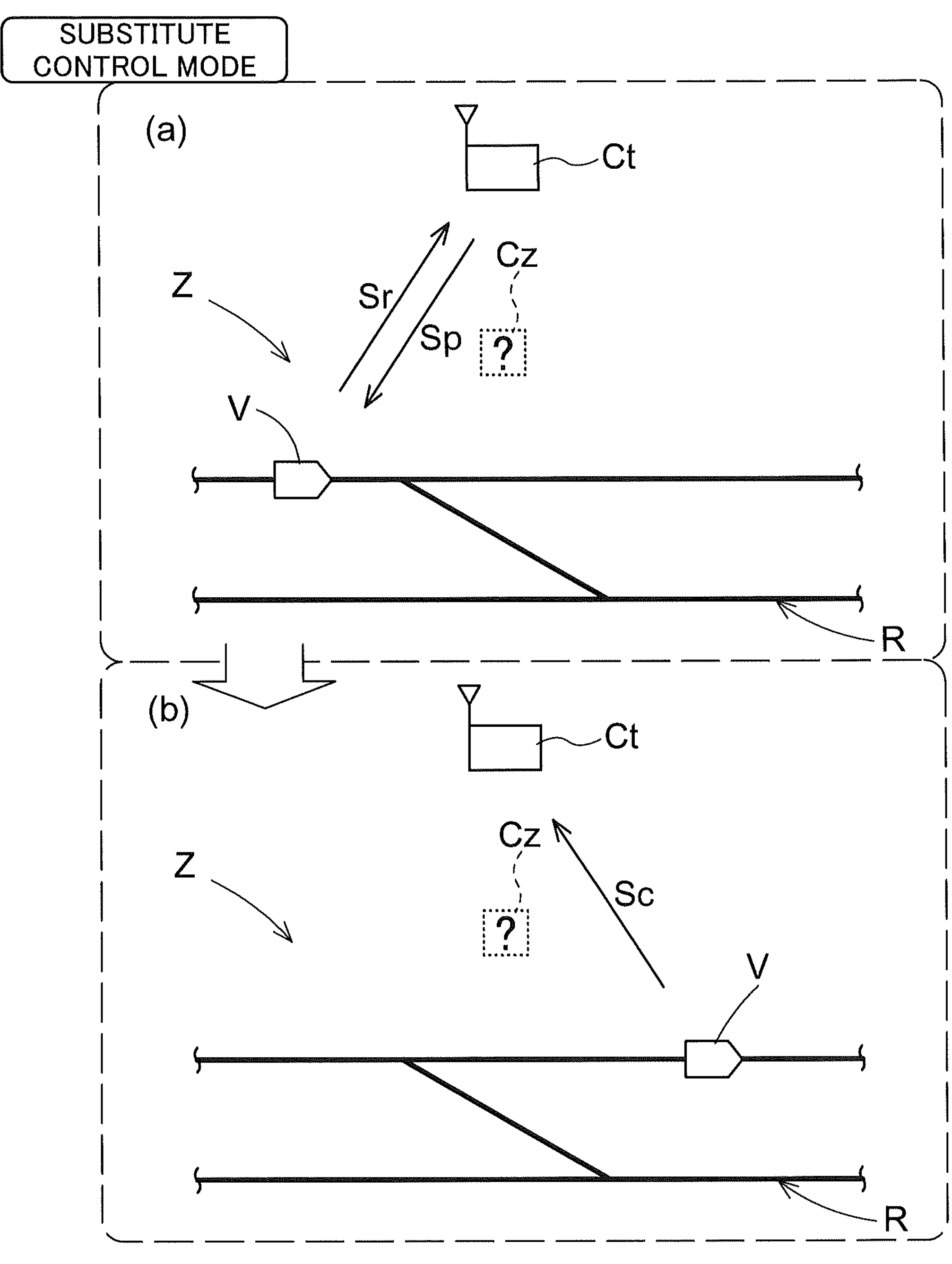
FIG. 7 shows a substitute control mode.

FIG. 7 shows control of a transport vehicle V in a specific section Z in which the substitute control mode is being executed.

As shown in FIG. 7, the substitute control mode is a mode in which control of the transport vehicles V in a specific section Z is performed by the higher-level control device Ct instead of the section control device Cz responsible for that specific section Z. The substitute control mode is executed in response to at least one an anomaly occurring in communication between the section control device Cz and the higher-level control device Ct and an anomaly occurring in communication between the section control device Cz and the transport vehicle V. That is, the section control device Cz being unable to communicate with at least one of the higher-level control device Ct and the transport vehicle V is recognized as an anomaly in communication involving the section control device Cz or an anomaly in the section control device Cz itself. Thus, in such a case, the substitute control mode is executed, and the higher-level control device Ct performs control of the transport vehicles V in the specific section Z, instead of the section control device Cz. In the present embodiment, the substitute control mode is executed in response to an anomaly occurring in communication between the section control device Cz and the higher-level control device Ct and an anomaly occurring in communication between the section control device Cz and the transport vehicle V. It is thereby possible to determine with a high degree of reliability that the anomaly occurred in communication involving the section control device Cz, or that the section control device Cz itself has failed. In this example, if an anomaly occurs in communication involving to the section control device Cz as described above, the substitute control mode is executed on further condition that communication between the higher-level control device Ct and the transport vehicles V is normal.

By utilizing the substitute control mode, the higher-level control device Ct is able to independently perform control of the transport vehicles Vin the specific sections Z. For example, even if the section control device Cz is not available for a different reason than a communication anomaly such as described above, that is, for a reason such as the section control device Cz undergoing maintenance or delivery of the section control device Cz being delayed, it is possible for the higher-level control device Ct to control travel of the transport vehicles V. Additionally, even if the transport vehicles V are caused to travel through the specific sections Z on a test basis, such as before starting up the article transport facility 100, for example, it is possible to control the transport vehicles V with only the higher-level control device Ct by utilizing the substitute control mode.

In the present embodiment, the higher-level control device Ct notifies the transport vehicles V that the transmission destination of the passage request signal Sr in the case of passing through a specific section Z in which the substitute control mode is being executed is the higher-level control device Ct. The transmission destination of the passage request signal Sr that is necessary in the case of passing through the specific sections Z can thereby be appropriately set in each of the transport vehicles V traveling through various parts of the travel route R. Accordingly, the transport vehicles V, when about to pass through each specific section Z, are able to smoothly request permission to pass through from the control device that has the authority to determine whether or not to approve passage.

In the present embodiment, the control device that has the authority to determine whether or not to approve passage of the transport vehicles V through each specific section Z is the higher-level control device Ct in the specific sections Z in which the substitute control mode is being executed, and is the section control device Cz responsible for that specific section Z in the specific sections Z in which the normal control mode is being executed. That is, each of the transport vehicles V transmits the passage request signal Sr to the higher-level control device Ct when passing through a specific section Z in which the substitute control mode is being executed. On the other hand, when passing through a specific section Z in which the substitute control mode is not being executed (e.g., specific section Z in which the normal control mode is being executed), each of the transport vehicles V transmits the passage request signal Sr to the section control device Cz responsible for that specific section Z.

As shown in FIG. 7A, in the substitute control mode, the transport vehicle V transmits the passage request signal Sr to the higher-level control device Ct when upstream of the specific section Z. Having received the passage request signal Sr, the higher-level control device Ct, in the case of permitting passage of the transport vehicle V that transmitted the passage request signal Sr, then transmits the passage permission signal Sp to the transport vehicle V.

As shown in FIG. 7B, the transport vehicle V, having received the passage permission signal Sp from the higher-level control device Ct, travels through the specific section Z. After passing through the specific section Z, the transport vehicle V then transmits the passage completion signal Sc to the higher-level control device Ct. The higher-level control device Ct, having received the passage completion signal Sc, becomes able to accept the next transport vehicle V to the specific section Z.

If the section control device Cz in which an anomaly is recognized can be restored by performing necessary measures such as repair on the section control device Cz while the substitute control mode is being executed in the specific section Z, transition from the substitute control mode to the normal control mode is performed. In the present embodiment, transition from the substitute control mode to the normal control mode is performed on condition that the higher-level control device Ct outputs a control instruction to the section control device Cz, and the higher-level control device Ct receives a response to the control instruction from the section control device Cz. Note that, in the substitute control mode, the higher-level control device Ct continues to perform control of the transport vehicles Vin the specific section Z until the response is received from the section control device Cz. If the response by the section control device Cz is received, the higher-level control device Ct then stops performing control of the transport vehicles V in the specific section Z, and the section control device Cz starts performing control. The transition from the substitute control mode to the normal control mode can thereby be performed smoothly, and, as a result, it is possible to avoid a period during which control of the transport vehicles V in the specific section Z is not performed.

The substitute control mode is executed in the specific sections Z in the manner described above. As described above, the substitute control mode is executed in specific sections Z where a section control device Cz in which an anomaly occurs in communication with at least one of the higher-level control device Ct and the transport vehicles V is provided, among the plurality of specific sections Z. In the present embodiment, the normal control mode is executed in specific sections Z where a section control device Cz in which communication with both the higher-level control device Ct and the transport vehicles V is normal is provided, among the plurality of specific sections Z.

Figure 8:
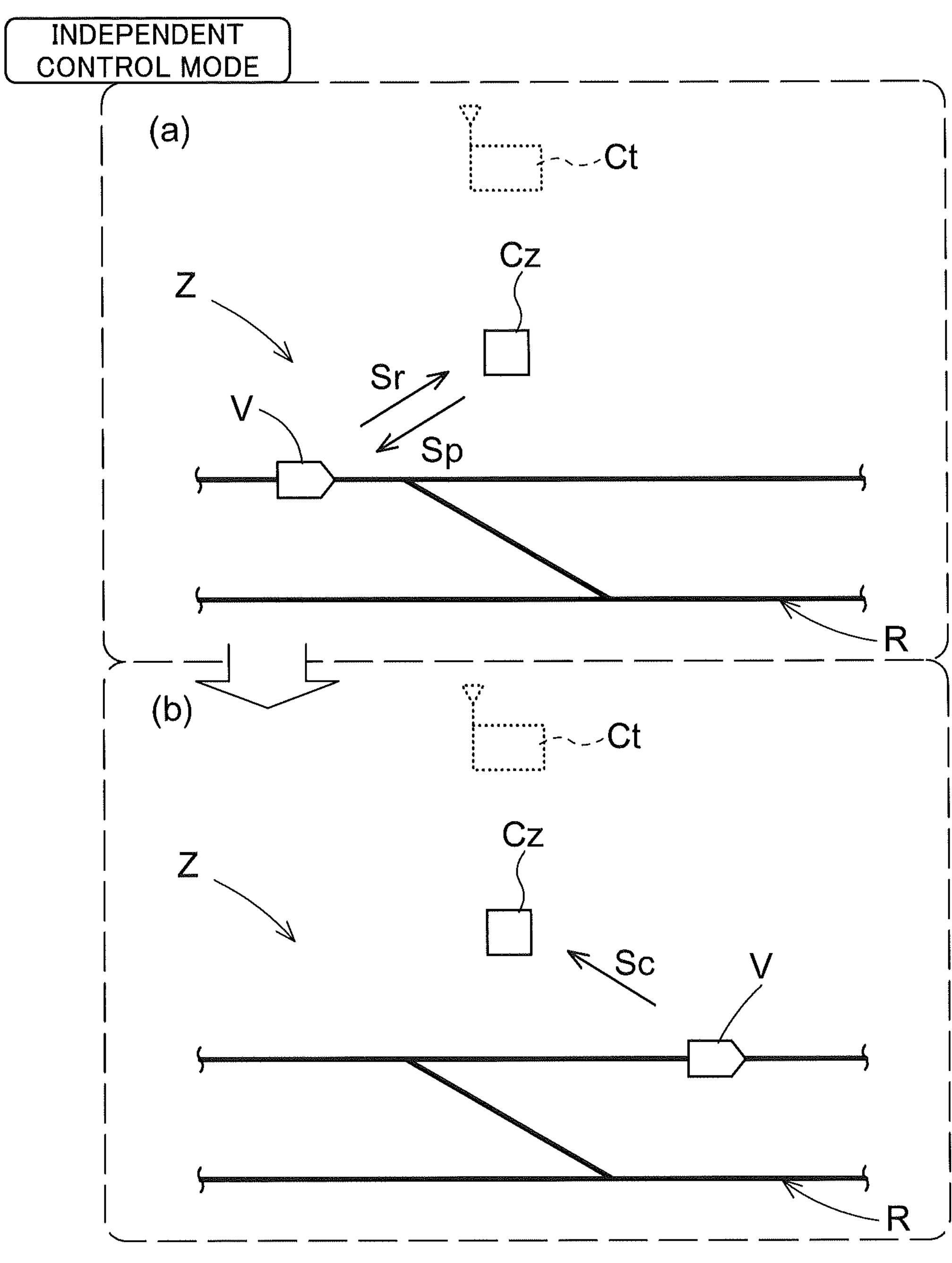
FIG. 8 shows an independent control mode.

FIG. 8 shows control of a transport vehicle V in a specific section Z in which the independent control mode is being executed.

As shown in FIG. 8, the independent control mode is a mode in which control of the transport vehicles V in a specific section Z is performed independently by the section control device Cz responsible for that specific section Z, without assist control by the higher-level control device Ct. Even if there is no assistance from the higher-level control device Ct, the section control device Cz is able to independently control the transport vehicles V in the specific section Z, by utilizing the independent control mode. For example, even if the higher-level control device Ct is not available due to the higher-level control device Ct undergoing maintenance or delivery of the higher-level control device Ct being delayed, it is possible for the section control device Cz to control travel of the transport vehicles V. Additionally, even if the transport vehicles V are caused to travel through the specific sections Z on a test basis, such as before starting up the article transport facility 100, for example, it is possible to control the transport vehicles V with only the section control devices Cz by utilizing the independent control mode.

As shown in FIG. 8A, in the independent control mode, the transport vehicle V transmits the passage request signal Sr to the section control device Cz when upstream of the specific section Z. Having received the passage request signal Sr, the section control device Cz, in the case of permitting passage of the transport vehicle V that transmitted the passage request signal Sr, transmits the passage permission signal Sp to the transport vehicle V.

As shown in FIG. 8B, the transport vehicle V, having received the passage permission signal Sp from the section control device Cz, travels through the specific section Z. After passing through the specific section Z, the transport vehicle V then transmits the passage completion signal Sc to the section control device Cz. The section control device Cz, having received the passage completion signal Sc, becomes able to accept the next transport vehicle V to the specific section Z.

Figures 9, 10:
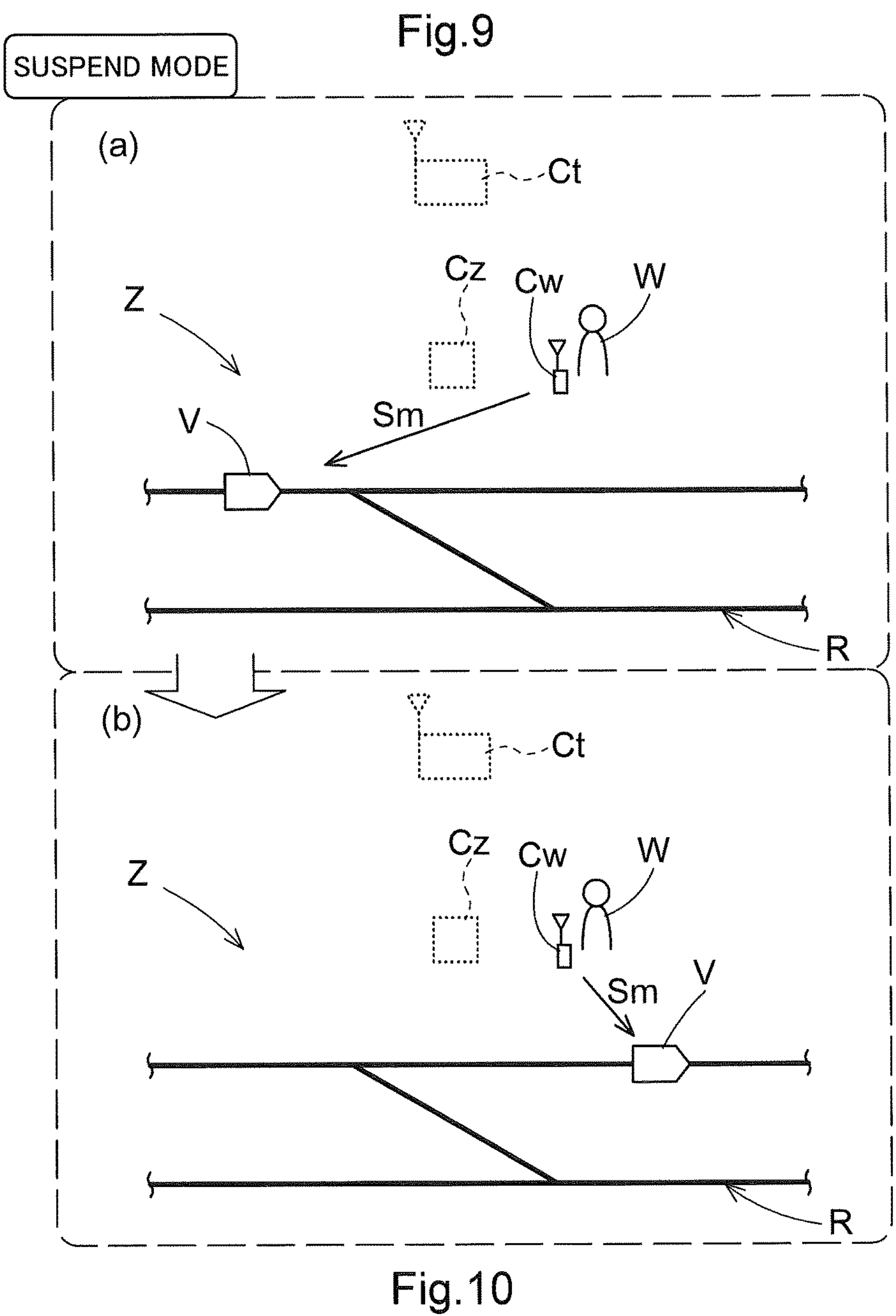
FIG. 9 shows a suspend mode.
FIG. 10 is a timing chart showing a communication cycle of the transport vehicles.

FIG. 9 shows control of a transport vehicle V in a specific section Z in which the suspend mode is being executed.

As shown in FIG. 9, the suspend mode is a mode in which control of the transport vehicles V in a specific section Z is not performed by either the higher-level control device Ct or the section control device Cz. For example, in the suspend mode, control of the transport vehicles V in the specific section Z is performed by a worker W. As shown in FIGS. 9A and 9B, an operation signal Sm is transmitted to the transport vehicle V by operation of an operation terminal Cw by the worker W, and the transport vehicle V is controlled based on the operation signal Sm. In the suspend mode in this example, the operation terminal Cw unilaterally transmits the operation signal Sm to the transport vehicle V, and the transport vehicle V does not transmit the passage request signal Sr or the passage completion signal Sc described above. This is merely by way of example, however, and does not preclude a configuration in which the transport vehicle V transmits signals to the operation terminal Cw.

By utilizing this suspend mode, work such as maintenance of the higher-level control device Ct and the section control devices Cz can be performed. Even while such work is being performed, it is possible to control the transport vehicles V in the specific sections Z due to the worker W using the operation terminal Cw, for example.

Hereinabove, a configuration is described in which the transport vehicles V transmit the passage request signal Sr or the passage completion signal Sc to the higher-level control device Ct or the section control devices Cz. In the present embodiment, the transport vehicles transmit signals in a prescribed communication cycle to the higher-level control device Ct and to the section control devices Cz. That is, the transport vehicles V transmit a signal to the higher-level control device Ct or the section control devices Cz, and, in the case where there is no response thereto, transmits the signal again. In this way, the communication cycle is the period from when a transport vehicle V transmits one signal until when the transport vehicle V transmits the next signal.

For example, with regard to the passage request signal Sr that the transport vehicles V transmit when requesting permission to pass through the specific sections Z, a shorter communication cycle is preferable because more opportunities for the transport vehicles V to receive permission to pass per unit time can be secured. A problem with this approach is that the processing load of the control device (higher-level control device Ct or section control devices Cz) that receives the passage request signal Sr increases, and in the case of the higher-level control device Ct which performs integrated management of the whole travel route R, this problem is marked.

In view of this, in the present embodiment, as shown in FIG. 10, a first communication cycle T1, which is the communication cycle between the transport vehicles V and the higher-level control device Ct, is set longer than a second communication cycle T2, which is the communication cycle between the transport vehicles V and the section control devices Cz.

The frequency of communication per unit time between the transport vehicles V and the higher-level control device Ct can thereby be reduced below the frequency of communication per unit time between the transport vehicles V and the section control devices Cz. Thus, even if communication between the transport vehicles V and the higher-level control device Ct is necessitated, it is possible to ensure that the processing load of the higher-level control device Ct does not become excessive. In contrast, since the frequency of communication per unit time between the transport vehicles V and the section control devices Cz can be increased above the frequency of communication per unit time between the transport vehicles V and the higher-level control device Ct, it becomes easier to secure more opportunities for the transport vehicles V to receive permission to pass from the section control devices Cz, for example.

OTHER EMBODIMENTS

Next, other embodiments of the article transport facility will be described.

(1) In the above embodiment, an example is described in which transition from the substitute control mode to the normal control mode is performed on condition that the higher-level control device Ct outputs a control instruction to the section control device Cz, and the higher-level control device Ct receives a response to the control instruction from the section control device Cz. However, the present invention is not limited to such an example, and transition from the substitute control mode to the normal control mode may be performed without waiting for a response from the section control device Cz.

(2) In the above embodiment, an example is described in which the normal control mode is executed in specific sections Z where section control devices Cz in which communication with both the higher-level control device Ct and the transport vehicles V is normal are provided, among the plurality of specific sections Z. However, the present invention is not limited to such an example, and the substitute control mode may be executed instead of the normal control mode, even in specific sections Z where section control devices Cz in which communication with both the higher-level control device Ct and the transport vehicles V is normal are provided.

(3) In the above embodiment, an example is described in which the higher-level control device Ct notifies the transport vehicles V that the transmission destination of the passage request signal Sr in the case of passing through a specific section Z in which the substitute control mode is being executed is the higher-level control device Ct, and the transport vehicles V each transmit the passage request signal Sr to the higher-level control device Ct in the case of passing through a specific section Z in which the substitute control mode is being executed. However, the present invention is not limited to such an example, and the higher-level control device Ct may not give prior notification to the transport vehicles V. The transport vehicle V transmits the passage request signal Sr to the section control device Cz responsible for the specific section Z in which the substitute control mode is being executed, and, if there is no response from the section control device Cz (there will naturally be no response because the substitute control mode is being executed), transmits the passage request signal Sr to the higher-level control device Ct.

(4) In the above embodiment, an example is described in which the first communication cycle T1, which is the communication cycle between the transport vehicles V and the higher-level control device Ct, is set longer than the second communication cycle T2, which is the communication cycle between the transport vehicles V and the section control devices Cz. However, the present invention is not limited to such an example, and the first communication cycle T1 and the second communication cycle T2 may be equivalent to each other in length.

(5) In the above embodiment, an example is described in which the independent control mode and the suspend mode are set as control modes, in addition to the normal control mode and the substitute control mode. However, the independent control mode and the suspend mode are not essential modes.

(6) Note that the configuration disclosed in the aforementioned embodiment can also be applied in combination with the configurations disclosed in the other embodiments, provided there are no inconsistencies. As for the remaining configuration, the embodiments disclosed herein are merely illustrative in all respects. Accordingly, various modifications can be made as appropriate, without departing from the spirit of the disclosure.

Summary of Embodiments

Hereinafter, the article transport facility illustrated above will be described.

An article transport facility including:

at least one transport vehicle configured to transport an article;

a travel route along which the at least one transport vehicle travels and provided with a plurality of specific sections each including at least one of a branch point and a merge point;

a section control device provided in correspondence with each of the specific sections and configured to control the at least one transport vehicle traveling through the specific section for which the section control device is responsible; and a higher-level control device configured to control the at least one transport vehicle and the section control devices, wherein the at least one transport vehicle, the section control devices and the higher-level control device are configured to communicate with each other, the article transport facility has a normal control mode and a substitute control mode, as control modes that are executed by a control system including the higher-level control device and the section control devices, the normal control mode is a mode in which control of the at least one transport vehicle in each of the specific sections is performed by the section control device responsible for the specific section, the substitute control mode is a mode in which control of the at least one transport vehicle in each of the specific sections is performed by the higher-level control device instead of the section control device responsible for the specific section, the normal control mode is executed while communication between the higher-level control device and the section control devices and communication between the section control devices and the at least one transport vehicle are normal, and the substitute control mode is executed in response to at least one of an anomaly occurring in communication between the section control devices and the higher-level control device and an anomaly occurring in communication between the section control devices and the at least one transport vehicle.

According to this configuration, while communication between the higher-level control device and the section control devices and communication between the section control devices and the transport vehicle are normal, control of the transport vehicle in the respective specific sections can be appropriately performed by the section control devices, due to the normal control mode being executed. In this way, in the normal state in which communication is normal, the section control devices perform control of the transport vehicle in the respective specific sections, thus also enabling the processing load of the higher-level control device to be reduced. On the other hand, in response to at least one of an anomaly occurring in communication between the section control devices and the higher-level control device and an anomaly occurring in communication between the section control devices and the transport vehicle, the higher-level control device performs control of the transport vehicle in the specific section, instead of the section control device responsible for that specific section, due to transitioning to the substitute control mode. Accordingly, even in the case where a section control device cannot control the transport vehicle in the specific section for which that section control device is responsible due to a communication anomaly, the higher-level control device is able to appropriately control the transport vehicle. As described above, according to this configuration, even in the case where an anomaly such as a communication fault or failure occurs in the control system, it is possible to appropriately control the transport vehicle traveling through the specific sections including at least one of a branch point and a merge point.

Preferably, the substitute control mode is executed in response to an anomaly occurring in communication between the section control devices and the higher-level control device and an anomaly occurring in communication between the section control devices and the transport vehicle.

According to this configuration, it is possible to reliably determine that an anomaly has occurred in communication involving the section control devices.

Preferably, transition from the substitute control mode to the normal control mode is performed on condition that the higher-level control device outputs a control instruction to the section control device, and the higher-level control device receives a response to the control instruction from the section control device, and in the substitute control mode, the higher-level control device continues to control the at least one transport vehicle in the specific section until the response is received from the section control device.

According to this configuration, transition from the substitute control mode to the normal control mode can be performed smoothly. Also, it is possible to avoid a period during which control of the transport vehicle in the specific sections is not performed.

Preferably, the substitute control mode is executed in any of the specific sections in which an anomaly in communication with at least one of the higher-level control device and the at least one transport vehicle occurs in the section control device responsible for the specific section, and the normal control mode is executed in any of the specific sections in which the section control device responsible for the specific section is communicating normally with both the higher-level control device and the at least one transport vehicle.

According to this configuration, an appropriate control mode can be executed according to the respective situations of the plurality of specific sections.

Preferably, the at least one transport vehicle includes a plurality of transport vehicles, the section control devices are each configured to control travel of any of the transport vehicles from which is received a passage request signal for passing through the specific section for which the section control device is responsible, the higher-level control device notifies the transport vehicles that a transmission destination of the passage request signal in a case of passing through any of the specific sections in which the substitute control mode is being executed is the higher-level control device, and the transport vehicles, in response to passing through any of the specific sections in which the substitute control mode is being executed, each transmit the passage request signal to the higher-level control device, and, in response to passing through any of the specific sections in which the substitute control mode is not being executed, each transmit the passage request signal to the section control device responsible for the specific section.

According to this configuration, the transmission destination of the passage request signal that is necessary in the case of passing through the specific sections can be appropriately set in each of the transport vehicles traveling through various parts of the travel route. Accordingly, the transport vehicles, when about to pass through each specific section, are able to smoothly request permission to pass through from the control device that has the authority to determine whether or not to approve passage.

Preferably, the at least one transport vehicle is configured to transmit a signal in a prescribed communication cycle to the higher-level control device and to the section control devices, and the communication cycle between the at least one transport vehicle and the higher-level control device is a first communication cycle that is longer than a second communication cycle, which is the communication cycle between the at least one transport vehicle and the section control devices.

According to this configuration, the frequency of communication per unit time between the transport vehicle and the higher-level control device can be reduced below the frequency of communication per unit time between the transport vehicle and the section control devices. Accordingly, even if communication between the transport vehicle and the higher-level control device is necessitated, it is possible to ensure that the processing load of the higher-level control device does not become excessive.

Preferably, in any of the specific sections in which the normal control mode is being executed, the section control device responsible for the specific section controls travel of the at least one transport vehicle, and the higher-level control device executes assist control for assisting control by the section control device, and in the assist control, in response to the section control device not subsequently receiving a response from a target transport vehicle, which is the transport vehicle from which the passage request signal is received, the higher-level control device notifies the section control device as to whether the target transport vehicle is present in the specific section.

According to this configuration, control of the transport vehicle in the specific sections can be performed more appropriately through cooperation between the section control devices and the higher-level control device.

Preferably, the control modes include an independent control mode, in addition to the normal control mode and the substitute control mode, and the independent control mode is a mode in which control of the at least one transport vehicle in each of the specific sections is independently performed by the section control device responsible for the specific section, without the assist control by the higher-level control device.

According to this configuration, even if there is no assistance by the higher-level control device, control of the transport vehicle in the specific sections can be independently performed by the section control devices. For example, even if the higher-level control device is not available for a reason such as the higher-level control device undergoing maintenance or delivery of the higher-level control device being delayed, it is possible for the section control devices to control travel of the transport vehicle.

INDUSTRIAL APPLICABILITY

The technology according to the present disclosure can be utilized in an article transport facility provided with a transport vehicle for transporting articles, a travel route provided with a specific section including at least one of a branch point and a merge point, and a section control device that controls the transport vehicle traveling through the specific section.

What is claimed is:

1. An article transport facility comprising:

a plurality of transport vehicles configured to transport an article;

a travel route along which at least one transport vehicle of the plurality of transport vehicles travels and provided with a plurality of specific sections each including at least one of a branch point and a merge point;

a section control device provided in correspondence with each of the specific sections and configured to control the at least one transport vehicle traveling through the specific section for which the section control device is responsible; and a higher-level control device configured to control the at least one transport vehicle and the section control devices, wherein:

the at least one transport vehicle, the section control devices and the higher-level control device are configured to communicate with each other, the article transport facility has a normal control mode and a substitute control mode, as control modes that are executed by a control system including the higher-level control device and the section control devices, the normal control mode is a mode in which control of the at least one transport vehicle in each of the specific sections is performed by the section control device responsible for the specific section, the substitute control mode is a mode in which control of the at least one transport vehicle in each of the specific sections is performed by the higher-level control device instead of the section control device responsible for the specific section, the normal control mode is executed while communication between the higher-level control device and the section control devices and communication between the section control devices and the at least one transport vehicle are normal, the substitute control mode is executed in response to at least one of an anomaly occurring in communication between the section control devices and the higher-level control device and an anomaly occurring in communication between the section control devices and the at least one transport vehicle, the substitute control mode is executed in any of the specific sections in which an anomaly in communication with at least one of the higher-level control device and the at least one transport vehicle occurs in the section control device responsible for the specific section, and the normal control mode is executed in any of the specific sections in which the section control device responsible for the specific section is communicating normally with both the higher-level control device and the at least one transport vehicle, the section control devices are each configured to control travel of any of the transport vehicles from which is received a passage request signal for passing through the specific section for which the section control device is responsible, the higher-level control device notifies the transport vehicles that a transmission destination of the passage request signal in a case of passing through any of the specific sections in which the substitute control mode is being executed is the higher-level control device, and the transport vehicles, in response to passing through any of the specific sections in which the substitute control mode is being executed, each transmit the passage request signal to the higher-level control device, and, in response to passing through any of the specific sections in which the substitute control mode is not being executed, each transmit the passage request signal to the section control device responsible for the specific section.

2. The article transport facility according to claim 1, wherein the substitute control mode is executed in response to an anomaly occurring in communication between the section control devices and the higher-level control device and an anomaly occurring in communication between the section control devices and the at least one transport vehicle.

3. The article transport facility according to claim 1, wherein transition from the substitute control mode to the normal control mode is performed on condition that the higher-level control device outputs a control instruction to the section control device, and the higher-level control device receives a response to the control instruction from the section control device, and wherein in the substitute control mode, the higher-level control device continues to control the at least one transport vehicle in the specific section until the response is received from the section control device.

4. An article transport facility comprising:

at least one transport vehicle configured to transport an article;

a travel route along which the at least one transport vehicle and provided with a plurality of specific sections each including at least one of a branch point and a merge point;

a section control device provided in correspondence with each of the specific sections and configured to control the at least one transport vehicle traveling through the specific section for which the section control device is responsible; and a higher-level control device configured to control the at least one transport vehicle and the section control devices, wherein:

the at least one transport vehicle, the section control devices and the higher-level control device are configured to communicate with each other, the article transport facility has a normal control mode and a substitute control mode, as control modes that are executed by a control system including the higher-level control device and the section control devices, the normal control mode is a mode in which control of the at least one transport vehicle in each of the specific sections is performed by the section control device responsible for the specific section, the substitute control mode is a mode in which control of the at least one transport vehicle in each of the specific sections is performed by the higher-level control device instead of the section control device responsible for the specific section, the normal control mode is executed while communication between the higher-level control device and the section control devices and communication between the section control devices and the at least one transport vehicle are normal, the substitute control mode is executed in response to at least one of an anomaly occurring in communication between the section control devices and the higher-level control device and an anomaly occurring in communication between the section control devices and the at least one transport vehicle, the at least one transport vehicle is configured to transmit a signal in a prescribed communication cycle to the higher-level control device and to the section control devices, and the communication cycle between the at least one transport vehicle and the higher-level control device is a first communication cycle that is longer than a second communication cycle, which is the communication cycle between the at least one transport vehicle and the section control devices.

5. An article transport facility comprising:

at least one transport vehicle configured to transport an article;

a travel route along which the at least one transport vehicle and provided with a plurality of specific sections each including at least one of a branch point and a merge point;

a section control device provided in correspondence with each of the specific sections and configured to control the at least one transport vehicle traveling through the specific section for which the section control device is responsible; and a higher-level control device configured to control the at least one transport vehicle and the section control devices, wherein:

the at least one transport vehicle, the section control devices and the higher-level control device are configured to communicate with each other, the article transport facility has a normal control mode and a substitute control mode, as control modes that are executed by a control system including the higher-level control device and the section control devices, the normal control mode is a mode in which control of the at least one transport vehicle in each of the specific sections is performed by the section control device responsible for the specific section, the substitute control mode is a mode in which control of the at least one transport vehicle in each of the specific sections is performed by the higher-level control device instead of the section control device responsible for the specific section, the normal control mode is executed while communication between the higher-level control device and the section control devices and communication between the section control devices and the at least one transport vehicle are normal, the substitute control mode is executed in response to at least one of an anomaly occurring in communication between the section control devices and the higher-level control device and an anomaly occurring in communication between the section control devices and the at least one transport vehicle, in any of the specific sections in which the normal control mode is being executed, the section control device responsible for the specific section controls travel of the at least one transport vehicle, and the higher-level control device executes assist control for assisting control by the section control device, and in the assist control, in response to the section control device not subsequently receiving a response from a target transport vehicle, which is the transport vehicle from which the passage request signal is received, the higher-level control device notifies the section control device as to whether the target transport vehicle is present in the specific section.

6. The article transport facility according to claim 5, wherein the control modes include an independent control mode, in addition to the normal control mode and the substitute control mode, and wherein the independent control mode is a mode in which control of the at least one transport vehicle in each of the specific sections is independently performed by the section control device responsible for the specific section, without the assist control by the higher-level control device.

* * * * *